United States Patent
Son et al.

(10) Patent No.: US 10,574,984 B2
(45) Date of Patent: Feb. 25, 2020

(54) INTRA PREDICTION METHOD AND DEVICE IN VIDEO CODING SYSTEM

(71) Applicant: LG ELECTRONICS INC., Seoul (KR)

(72) Inventors: Eunyong Son, Seoul (KR); Seungwook Park, Seoul (KR); Yongjoon Jeon, Seoul (KR); Jin Heo, Seoul (KR); Moonmo Koo, Seoul (KR); Sunmi Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 15/758,967

(22) PCT Filed: Aug. 25, 2016

(86) PCT No.: PCT/KR2016/009454
§ 371 (c)(1),
(2) Date: Mar. 9, 2018

(87) PCT Pub. No.: WO2017/043786
PCT Pub. Date: Mar. 16, 2017

(65) Prior Publication Data
US 2019/0052875 A1   Feb. 14, 2019

Related U.S. Application Data

(60) Provisional application No. 62/216,376, filed on Sep. 10, 2015.

(51) Int. Cl.
*H04N 19/11*   (2014.01)
*H04N 19/105*   (2014.01)
(Continued)

(52) U.S. Cl.
CPC ........... *H04N 19/11* (2014.11); *H04N 19/105* (2014.11); *H04N 19/176* (2014.11); *H04N 19/593* (2014.11); *H04N 19/82* (2014.11)

(58) Field of Classification Search
CPC .. H04N 19/105; H04N 19/176; H04N 19/593; H04N 19/85; H04N 19/82; H04N 19/46; H04N 19/11; H04N 19/80
See application file for complete search history.

(56) References Cited

U.S. PATENT DOCUMENTS 10,045,042 B2 * 8/2018 Lee ................... H04N 19/593
2010/0111431 A1   5/2010 Gharavi-Alkhansari
(Continued)

FOREIGN PATENT DOCUMENTS

EP        2704435        3/2014
JP        2011030175     2/2011
(Continued)

OTHER PUBLICATIONS

Partial Supplementary European Search Report in European Appln. No. 16844606.0, dated Feb. 21, 2019, 12 pages.
(Continued)

*Primary Examiner* — Neil R Mikeska
(74) *Attorney, Agent, or Firm* — Fish & Richardson P.C.

(57) ABSTRACT

An intra prediction method includes the steps of: acquiring intra prediction mode information from a bitstream; deriving neighboring samples of a current block; determining an intra prediction mode for the current block on the basis of the intra prediction mode information; deriving a prediction sample of the current block on the basis of the intra prediction mode and the neighboring samples; determining filtering reference samples for the prediction sample on the basis of the intra prediction mode; and deriving a filtered prediction sample by applying filtering to the prediction sample on the basis of the filtering reference samples. According to the present invention, a prediction sample can be adaptively filtered according to the intra prediction mode, and intra prediction performance can be improved.

16 Claims, 10 Drawing Sheets

(51) Int. Cl.
*H04N 19/176* (2014.01)
*H04N 19/593* (2014.01)
*H04N 19/82* (2014.01)

(56) References Cited

U.S. PATENT DOCUMENTS

| | | | |
|---|---|---|---|
| 2010/0322309 A1* | 12/2010 | Huang | H04N 19/157 |
| | | | 375/240.12 |
| 2011/0038415 A1* | 2/2011 | Min | H04N 19/115 |
| | | | 375/240.12 |
| 2011/0200103 A1* | 8/2011 | Kim | H04N 19/159 |
| | | | 375/240.03 |
| 2012/0093426 A1 | 4/2012 | Sato | |
| 2012/0147955 A1 | 6/2012 | Budagavi | |
| 2013/0128961 A1* | 5/2013 | Kim | H04N 19/82 |
| | | | 375/240.03 |
| 2013/0272623 A1* | 10/2013 | Jeon | H04N 19/159 |
| | | | 382/238 |
| 2013/0301720 A1* | 11/2013 | Lee | H04N 19/105 |
| | | | 375/240.12 |
| 2014/0072057 A1* | 3/2014 | Tourapis | H04N 19/176 |
| | | | 375/240.25 |
| 2015/0146779 A1* | 5/2015 | Bang | H04N 19/82 |
| | | | 375/240.12 |
| 2015/0201213 A1* | 7/2015 | Suzuki | H04N 19/593 |
| | | | 375/240.12 |
| 2016/0330481 A1* | 11/2016 | Zhang | H04N 19/117 |

FOREIGN PATENT DOCUMENTS

| | | |
|---|---|---|
| JP | 2013098713 | 5/2013 |
| KR | 10-2011-0054244 A1 | 5/2011 |
| KR | 10-2013-0126928 A1 | 11/2013 |
| KR | 10-2014-0145606 A1 | 12/2014 |
| KR | 10-2015-0038688 A1 | 4/2015 |
| WO | WO2004064406 | 7/2004 |

OTHER PUBLICATIONS

Search Report dated Nov. 16, 2016 for Application No. PCT/KR2016/009454, 6 pages.

* cited by examiner

INTRA PREDICTION METHOD AND DEVICE IN VIDEO CODING SYSTEM

CROSS-REFERENCE TO RELATED APPLICATIONS

This application is the National Stage filing under 35 U.S.C. 371 of International Application No. PCT/KR2016/009454, filed on Aug. 25, 2016, which claims the benefit of U.S. Provisional Application No. 62/216,376 filed on Sep. 10, 2015, the contents of which are all hereby incorporated by reference herein in their entirety.

BACKGROUND

Field of the Invention

The present invention relates to a video coding technique, and more specifically, to an intra-prediction method and device in a video coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

An object of the present invention is to provide a method and device for improving inter-prediction efficiency.

Another object of the present invention is to provide a method and device for applying filtering to an intra-prediction sample.

Yet another object of the present invention is to provide a method and device for adaptively deriving a type and/or a filter coefficient of a filter according to intra-prediction mode.

Still another object of the present invention is to provide a method and device for adaptively deriving a type and/or a filter coefficient of a filter according to the position of a prediction sample.

According to an embodiment of the present invention, an intra-prediction method performed by a decoding device is provided. The intra-prediction method includes: acquiring intra-prediction mode information from a bitstream; deriving neighboring samples of a current block; determining an intra-prediction mode for the current block on the basis of the intra-prediction mode information; deriving a prediction sample of the current block on the basis of the intra-prediction mode and the neighboring samples; determining filtering reference samples for the prediction sample on the basis of the intra-prediction mode; and applying filtering to the prediction sample on the basis of the filtering reference samples to derive a filtered prediction sample.

According to another embodiment of the present invention, an intra-prediction method performed by an encoding device is provided. The intra-prediction method includes: deriving neighboring samples of a current block; determining an intra-prediction mode for the current block; deriving a prediction sample of the current block on the basis of the intra-prediction mode and the neighboring samples; determining filtering reference samples for the prediction sample on the basis of the intra-prediction mode; applying filtering to the prediction sample on the basis of the filtering reference samples to derive a filtered prediction sample; and encoding and outputting intra-prediction mode information indicating the intra-prediction mode.

According to another embodiment of the present invention, a decoding device performing an intra-prediction method is provided. The decoding device includes: an entropy decoder configured to acquire intra-prediction mode information from a bitstream; and a predictor configured to derive neighboring samples of a current block, to determine an intra-prediction mode for the current block on the basis of the intra-prediction mode information, to derive a prediction sample of the current block on the basis of the intra-prediction mode and the neighboring samples, to determine filtering reference samples for the prediction sample on the basis of the intra-prediction mode, and to apply filtering to the prediction sample on the basis of the filtering reference samples to derive a filtered prediction sample.

According to another embodiment of the present invention, an encoding device performing an intra-prediction method is provided. The encoding device includes: a predictor configured to derive neighboring samples of a current block, to determine an intra-prediction mode for the current block, to derive a prediction sample of the current block on the basis of the intra-prediction mode and the neighboring samples, to determine filtering reference samples for the prediction sample on the basis of the intra-prediction mode, and to apply filtering to the prediction sample on the basis of the filtering reference samples to derive a filtered prediction sample; and an entropy encoder configured to encode and output intra-prediction mode information indicating the intra-prediction mode.

According to the present invention, it is possible to adaptively filter prediction samples according to intra-prediction mode and to improve intra-prediction performance.

According to the present invention, it is possible to apply filtering using various filter patterns to prediction samples according to a category to which an intra-prediction mode belongs and to adaptively determine filter strength according to prediction sample position.

Therefore, it is possible to improve intra-prediction performance while minimizing transmission of additional auxiliary information and thus to reduce the quantity of data necessary for a residual signal and improve overall coding efficiency according to the present invention.

DETAILED DESCRIPTION

Figure 1:
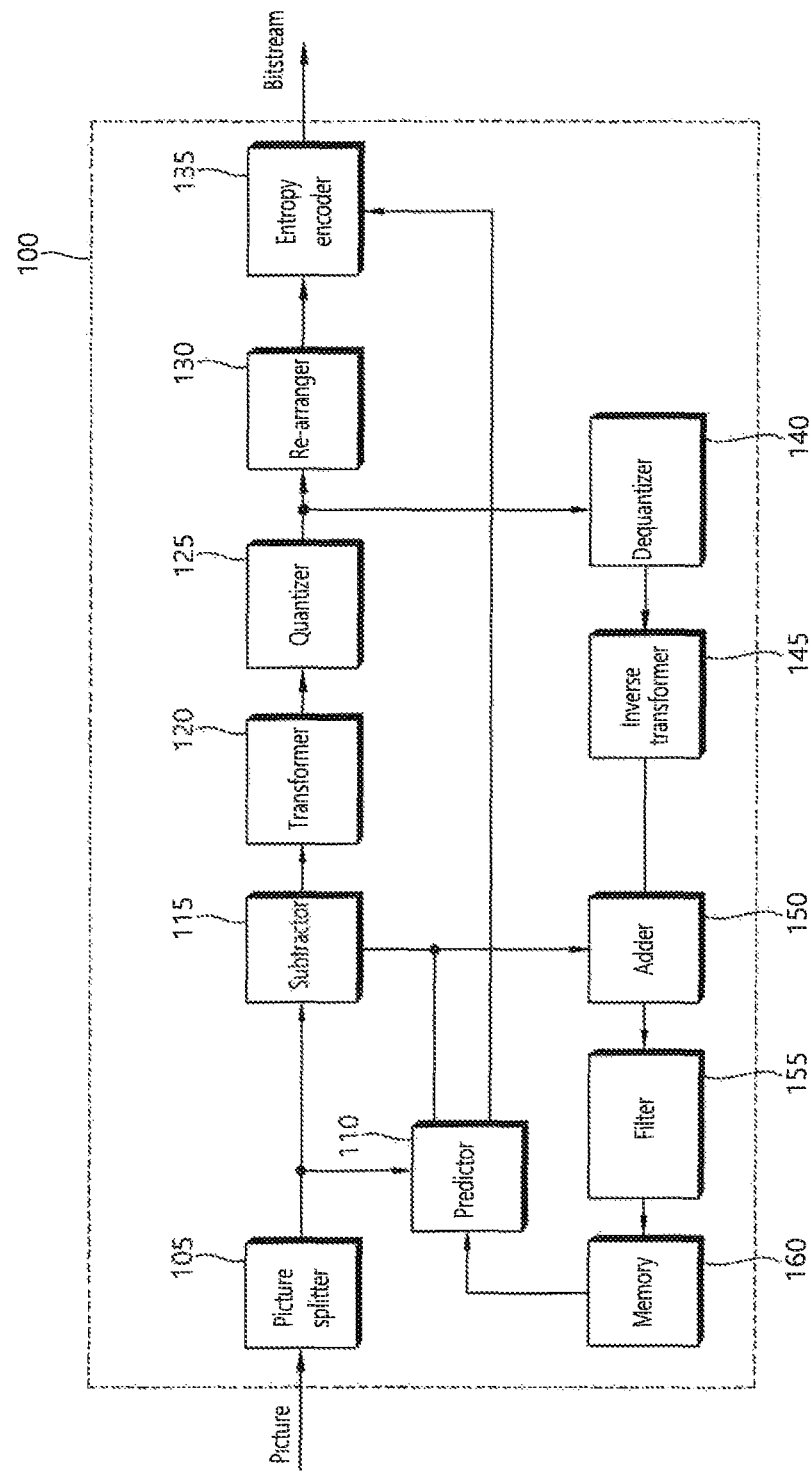
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture splitter 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture splitter 105 may split an input picture into at least one processing unit. Here, a processing unit may be a coding unit (CU), a prediction unit (PU) or a transform unit (TU). The coding unit is a unit block of coding and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit on the basis of coding efficiency according to video characteristics. When a smallest coding unit (SCU) is set, a coding unit cannot be split into a coding unit smaller than the smallest coding unit. Here, the final coding unit refers to a coding unit partitioned or split into a prediction unit or a transform unit. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block on the basis of a reference sample outside the current block in a picture to which the current block belongs (hereinafter, a current picture). In this case, the predictor 110 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block on the basis of a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned on the basis of a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation on the basis of the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
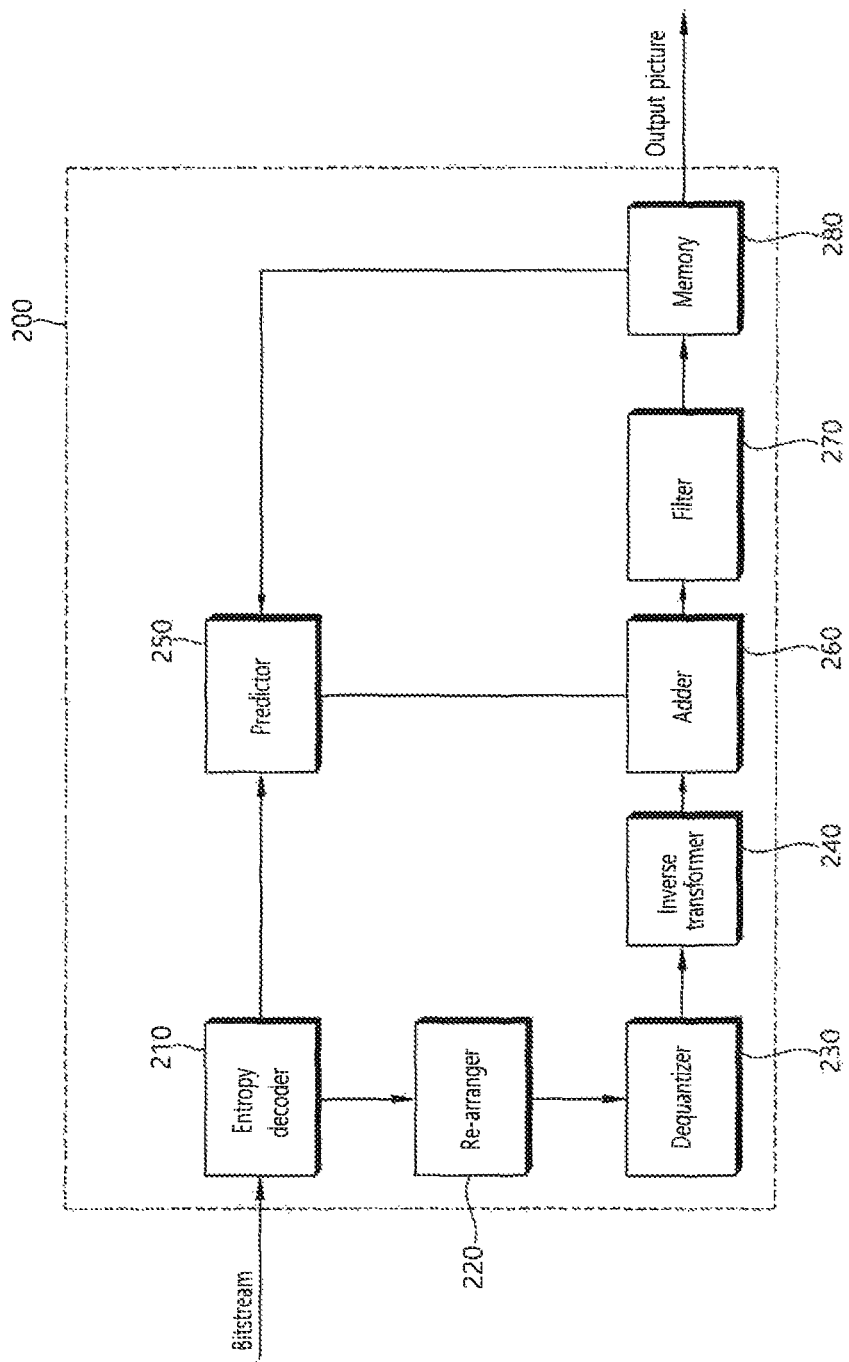
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream on the basis of a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients on the basis of a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block on the basis of a neighboring reference sample in a current picture. The predictor 250 may derive the prediction sample for the current block by applying a directional mode or a non-directional mode on the basis of the neighboring reference sample of the current block. In this case, a prediction mode to be applied to the current block may be determined by using an intra-prediction mode of a neighboring block.

In the case of inter-prediction, the predictor 250 may derive a prediction sample for a current block on the basis of a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived on the basis of the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

In a video coding system, intra-prediction or inter-prediction can be applied for coding efficiency, as described above. When intra-prediction is applied, neighboring samples of a current block in a current picture may be used as reference samples for the current block. In this case, prediction samples of the current block can be derived on the basis of the neighboring reference samples according to the intra-prediction mode of the current block. An encoding device may determine the intra-prediction mode on the basis of rate-distortion optimization (RDO) and signal information related thereto a decoding device.

For example, intra-prediction modes may include the following 35 prediction modes.

TABLE 1

| Intra-prediction mode | Associated name |
| --- | --- |
| 0 | Intra-planar |
| 1 | Intra-DC |
| 2, . . . , 34 | Intra-angular 2, . . . , Intra-angular 34 |

Here, intra-prediction mode #0 indicates an intra-planar mode and intra-prediction mode #1 indicates an intra-DC mode. Intra-prediction modes #2 to #34 respectively indicate intra-angular 2 to intra-angular 34 modes.

Here, the intra-planar mode and the intra-DC mode may be called an intra-non-directional mode and the intra-angular 2 to intra-angular 34 modes may be called an intra-directional mode.

Figure 3:
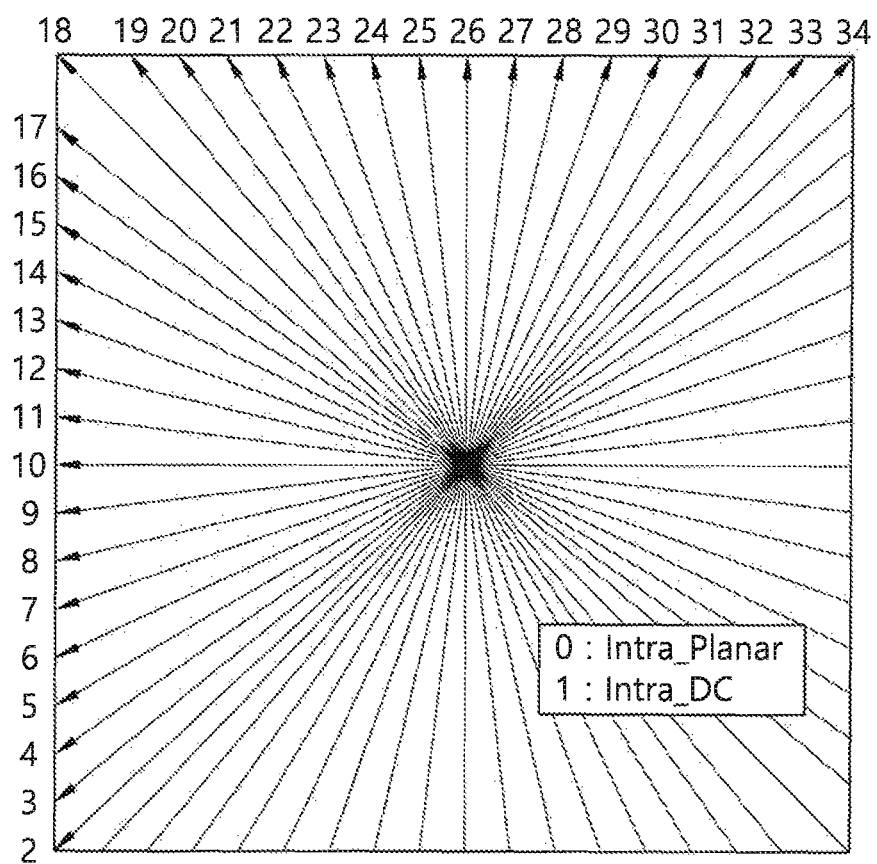
FIG. 3 illustrates intra-prediction modes according to the present invention.

FIG. 3 illustrates intra-prediction modes according to the present invention.

Referring to FIG. 3, intra-prediction modes #0 and #1 do not have directionality, and a prediction sample can be derived on the basis of bidirectional interpolation of neighboring samples or the average of the neighboring samples. Intra-prediction modes #2 to #34 have directionality as shown, and a prediction sample can be derived based on neighboring reference samples positioned in a corresponding prediction direction on the basis of the position of the prediction sample. In this case, if neighboring samples in units of an integer sample are not present in the corresponding prediction direction, a fractional sample may be generated through interpolation of two neighboring integer samples in the corresponding direction and the prediction sample may be derived on the basis of the fractional sample.

When intra-prediction is performed on the current block on the basis of the intra-directional mode such as intra-prediction modes #2 to #34, neighboring prediction samples in a prediction direction have uniform prediction values whereas neighboring samples in a different direction from the prediction direction have discontinuous prediction values, and thus an unnatural prediction result different from the original image may be derived.

Figure 4:
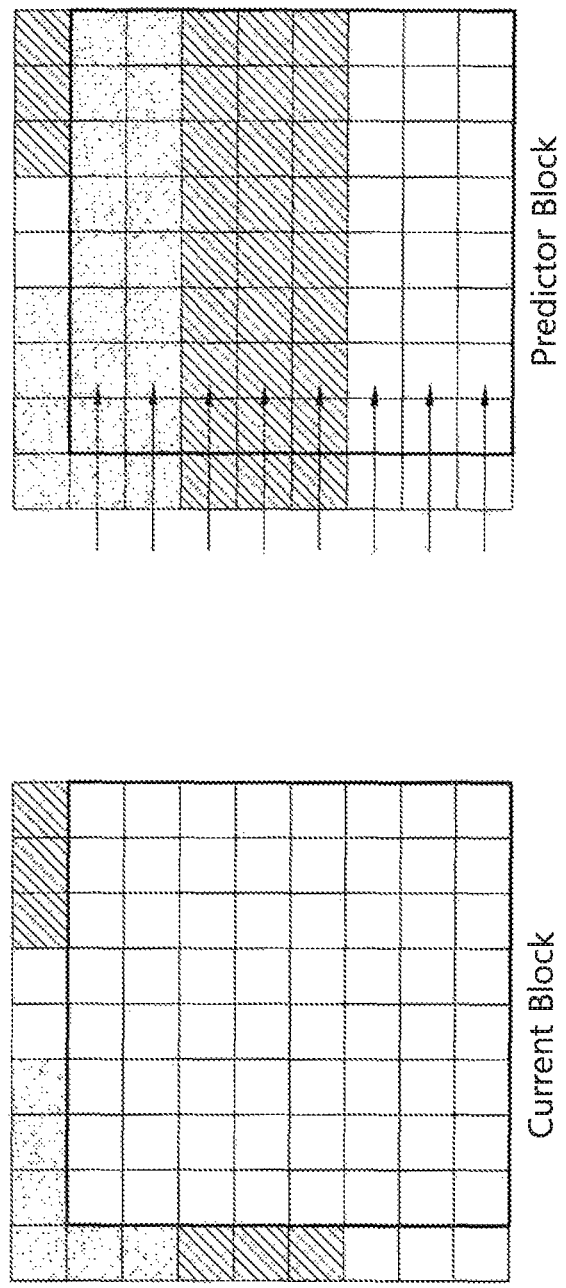
FIG. 4 illustrates a case in which an intra-directional mode having a horizontal prediction direction is applied to a current block.

FIG. 4 illustrates an exemplary case in which an intra-directional mode having a horizontal prediction direction is applied to a current block.

Referring to FIG. 4, intra-prediction is performed on the current block using neighboring samples. Specifically, when the intra-directional mode of the current block is the horizontal mode (i.e. intra-prediction mode #10), values of samples positioned on the left of the current block, among neighboring samples of the current block, are duplicated in the prediction direction to generate a predictor block including prediction samples in the current block. In this case, the prediction samples in the predictor block have uniform prediction values in the prediction direction but have discontinuous prediction values in directions other than the prediction direction, as described above. Such discontinuous characteristic of the prediction samples of the predictor block affects a residual signal and deteriorates transform coding efficiency. Accordingly, the present invention proposes a method of adaptively applying a filter (e.g., smoothing filter) for correcting such discontinuous characteristic of the prediction samples of the predictor block to improve video compression efficiency. A filtering method according to the present invention may be called a prediction sample post-processing filtering method.

According to the present invention, different types of filters can be applied to a predictor block according to prediction directions of intra-prediction modes. Specifically, according to the present invention, directional modes can be divided into a plurality of categories and filtering can be applied depending on the category in which the intra-directional mode of the current block belongs. For example, the directional modes can be divided into four categories according to prediction directions thereof.

Figure 5:
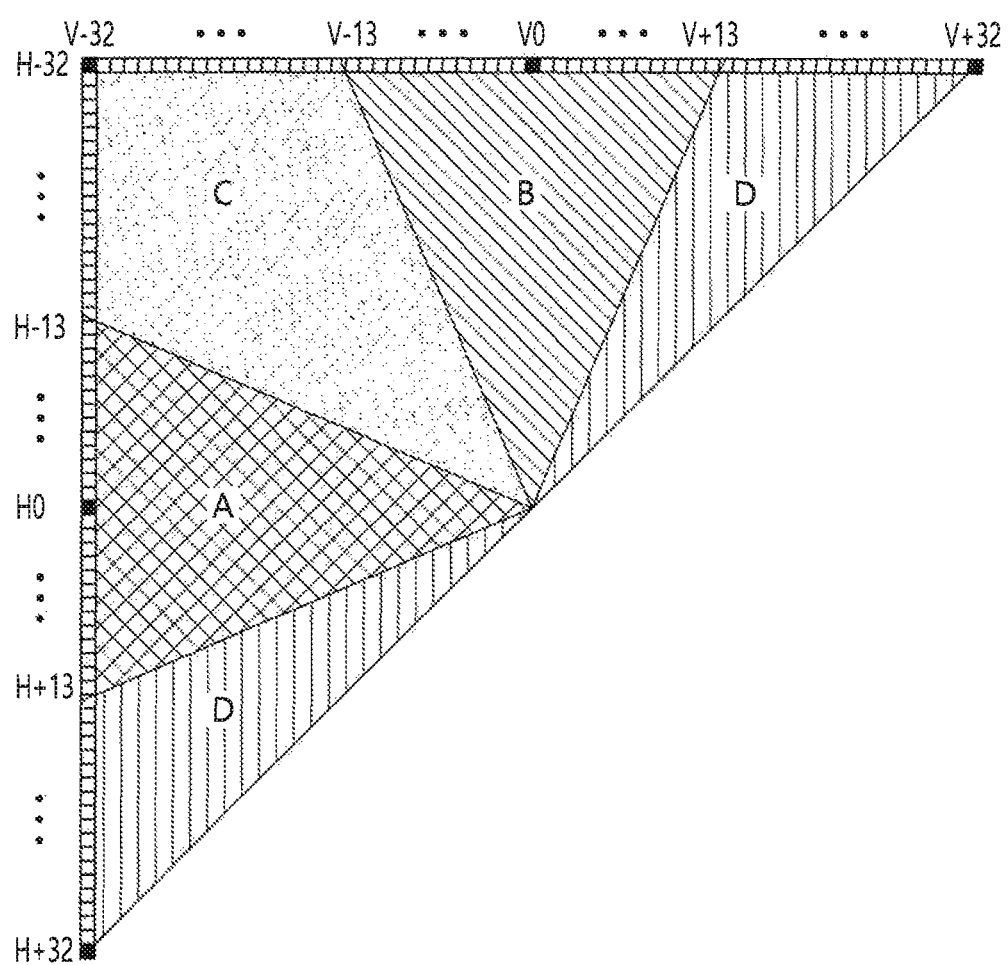
FIG. 5 illustrates an example in which intra-directional modes are equally divided into four categories.

FIG. 5 illustrates an example of equally dividing the intra-directional modes into four categories. In this case, the intra-directional modes can be equally divided according to angles of corresponding prediction directions. That is, the angle considered for intra-prediction can be equally split into quarters and the intra-directional modes can be divided into four categories on the basis of the split angles.

Referring to FIG. 5, intra-prediction modes having horizontal directionality can be discriminated from intra-prediction modes having vertical directionality on the basis of intra-prediction mode #18 having a left-upward diagonal prediction direction. In FIG. 5, H and V respectively refer to horizontal directionality and vertical directionality and numerals −32 to 32 indicate displacements in units of 1/32 at sample grid positions.

Figure 6:
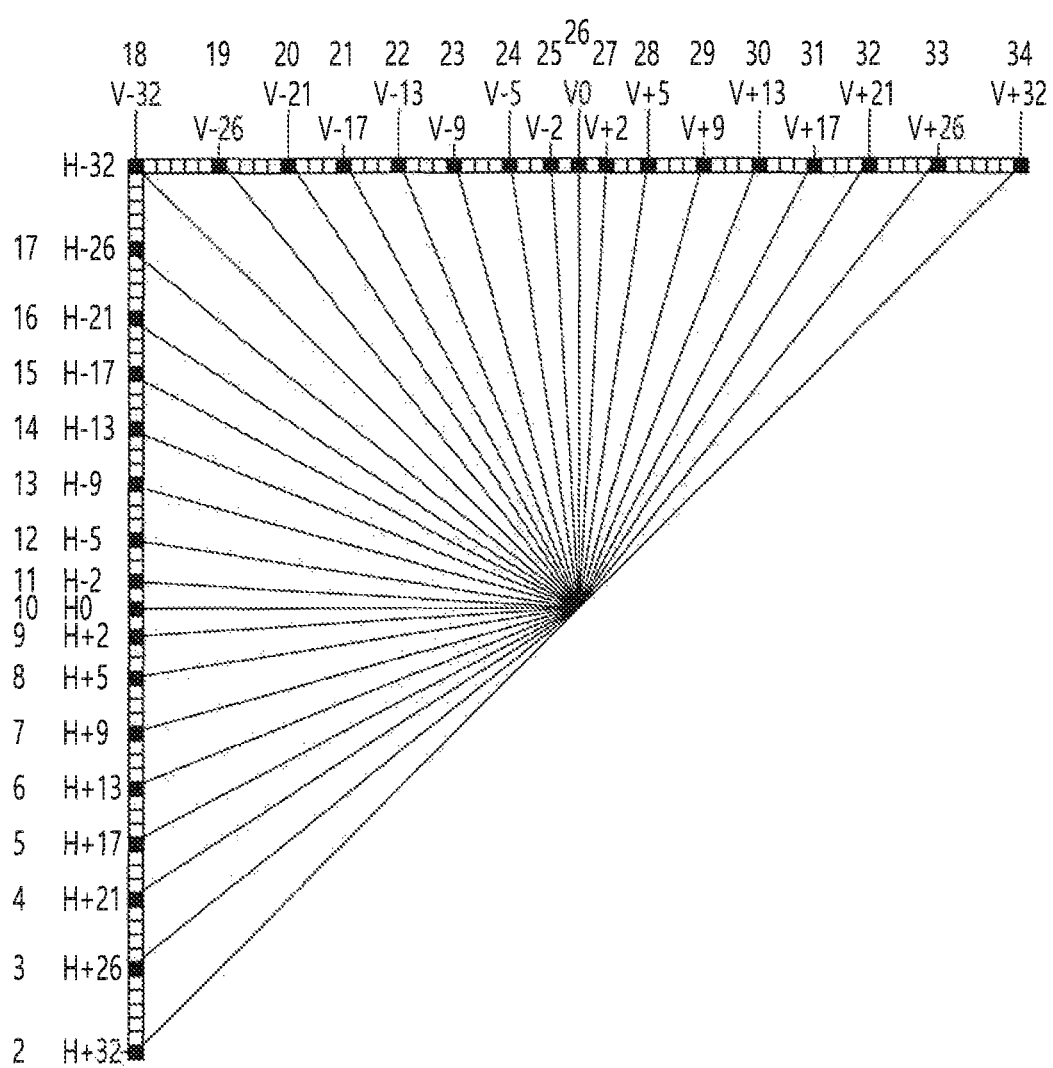
FIG. 6 illustrates a corresponding relation between H−32 to H+32 and V−32 to V+32 displacements and intra-directional modes.

FIG. 6 illustrates a corresponding relation between H−32 to H+32 and V−32 to V+32 displacements and intra-directional modes.

For example, direction H+32 can correspond to the prediction direction of intra-prediction mode #2, direction H+26 can correspond to the prediction direction of intra-prediction mode #3, and direction H+21 can correspond to the prediction direction of intra-prediction mode #4 on the basis of the center. In addition, direction V−32 can correspond to the prediction direction of intra-prediction mode #18, direction V−26 can correspond to the prediction direction of intra-prediction mode #19, and direction V−21 can correspond to the prediction direction of intra-prediction mode #20 on the basis of the center.

Here, intra-prediction modes #2 to #17 can be regarded to have horizontal directionality and intra-prediction modes #18 to #34 can be regarded to have vertical directionality. In this case, a relative angle corresponding to each intra-prediction mode having horizontal directionality can be represented on the basis of a horizontal reference angle of 0° corresponding to intra-prediction mode #10 having a horizontal prediction direction, and a relative angle corresponding to each intra-prediction mode having vertical directionality can be represented on the basis of a vertical reference angle of 0° corresponding to intra-prediction mode #26 having a vertical prediction direction.

Referring back to FIG. 5, when the intra-directional modes are equally divided into four categories, the four categories may be represented by categories A to D. In this case, directions belonging to the range of H+32 to H+14 may be categorized as category D, directions belonging to the range of H+13 to H−13 may be categorized as category A, directions belonging to the range of H−14 to V−14 may be categorized as category C, directions belonging to the range of V−13 to V+13 may be categorized as category B, and directions belonging to the range of V+14 to V+32 may be categorized as category D.

In this case, the category corresponding to each intra-directional mode may be derived as shown in the following table.

TABLE 2

| Category | Intra-prediction mode |
|---|---|
| A | 6, 7, 8, 9, 10, 11, 12, 13, 14 |
| B | 22, 23, 24, 25, 26, 27, 28, 29, 30 |
| C | 15, 16, 17, 18, 19, 20, 21 |
| D | 2, 3, 4, 5, 31, 32, 33, 34 |

The intra-directional modes may be unequally divided into four categories. This may be called random division. In this case, the category corresponding to each intra-directional mode can be randomly determined. For example, an optimal category corresponding to each intra-directional mode can be derived on the basis of statistical characteristics according to repeated tests.

When the intra-directional modes are unequally divided into four categories, the intra-directional modes and categories corresponding thereto can be represented as shown in the following table.

TABLE 3

| | Intra-prediction mode | | | | | | | | | | |
|---|---|---|---|---|---|---|---|---|---|---|---|
| | 2 | 3 | 4 | 5 | 6 | 7 | ... | 30 | 31 | 32 | 33 | 34 |
| Category | D | D | D | A | C | B | ... | B | B | D | D | D |

A filter pattern applied to a predictor block may be determined on the basis of the aforementioned categories. In this case, each prediction sample value in the predictor block can be corrected using the determined filter pattern. For example, when a 3-tap filter is applied, filter patterns according to the categories may be determined as follows.

Figure 7A:
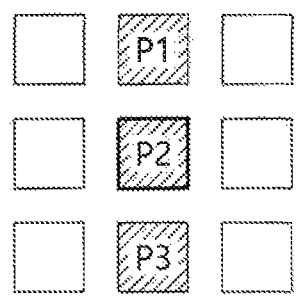
FIGS. 7A-7D illustrate filter patterns according to categories.
Figure 7B:
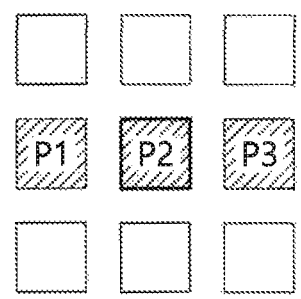
Figure 7C:
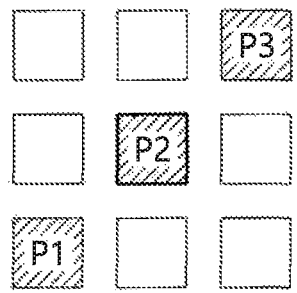
Figure 7D:
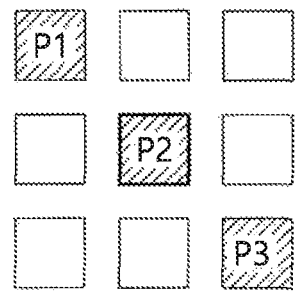

FIGS. 7A-7D illustrate filter patterns according to categories. Specifically, FIG. 7A illustrates a filter pattern for category A, FIG. 7B illustrates a filter pattern for category B, FIG. 7C illustrates a filter pattern for category C and FIG. 7D illustrates a filter pattern for category D. Hereinafter, the filter pattern for category A may be called a vertical pattern, the filter pattern for category B may be called a horizontal pattern, the filter pattern for category C may be called right-upward diagonal pattern and the filter pattern for category D may be called a left-upward diagonal pattern.

Referring to FIGS. 7A-7D, P2 indicates a filtering target (prediction) sample in a predictor block, P1 and P3 indicate filtering reference samples used to filter the target sample. Specifically, when category A is applied to the current block, an upper neighboring sample and a lower neighboring sample of the target sample can be used to filter the target sample. When category B is applied to the current block, a left neighboring sample and a right neighboring sample of the target sample can be used to filter the target sample. When category C is applied to the current block, a left lower neighboring sample and a right upper neighboring sample of the target sample can be used to filter the target sample. When category D is applied to the current block, a left upper neighboring sample and a right lower neighboring sample of the target sample can be used to filter the target sample.

In this case, P1 and P2 may be prediction samples within the current block (or predictor block) if the target sample is not positioned at the boundary (e.g., the left boundary or the upper boundary) of the current block (or predictor block), whereas at least one of P1 and P2 may be a reconstructed sample of a neighboring block if the target sample is positioned at the boundary (e.g., the left boundary or the upper boundary) of the current block (or predictor block). For example, when category A is applied to the current block and the target sample P2 is positioned in proximity to the upper boundary of the current block, the upper neighboring sample P1 may be a reconstructed sample of an upper neighboring block of the current block. As another example, when category B is applied to the current block and the target sample P2 is positioned in proximity to the left boundary of the current block, the left neighboring sample P1 may be a reconstructed sample of a left neighboring block of the current block. As another example, the left lower neighboring sample P1 may be a reconstructed sample of a left or left lower neighboring block of the current block when category C is applied to the current block and the target sample P2 is positioned in proximity to the left boundary of the current block, and the right upper neighboring sample P3 may be a reconstructed sample of an upper or right upper neighboring block of the current block when category C is applied to the current block and the target sample P2 is positioned in proximity to the upper boundary of the current block. As another example, the left upper neighboring sample P1 may be a reconstructed sample of a left or left lower neighboring block of the current block when category D is applied to the current block and the target sample P2 is positioned in proximity to the left boundary of the current block, and the right upper neighboring sample P3 may be a reconstructed sample of an upper or right upper neighboring block of the current block when category D is applied to the current block and the target sample P2 is positioned in proximity to the upper boundary of the current block.

Filtering according to the present invention may be applied to each (prediction) sample in the current block after prediction samples with respect to the current block are derived. When the coordinates of the target sample P2 is (x, y), the filtering may be performed on the basis of the following filtering operation expression.

$$Pred'[x, y] = \left(\alpha P1 + \beta P2 + \gamma P3 + \frac{\alpha + \beta + \gamma}{2}\right) / (\alpha + \beta + \gamma) \quad \text{[Expression 1]}$$

Here, Pred' indicates a filtered prediction sample, P2 indicates a target sample value, P1 and P3 indicate filtering reference sample values according to filter pattern, and $\alpha$, $\beta$ and $\gamma$ indicates filter coefficients. The filter coefficients may be predefined or information on the filter coefficients may be signaled from an encoding device. Alternatively, a set of a plurality of filter coefficients may be configured and the filter coefficients may be selected from the filter coefficient set according to a specific condition, as will be described later.

According to the present invention, filtering may be optionally applied on the basis of a difference between the value of the target sample value and the value of a neighboring reference sample. In this case, filtering can be applied to the target sample using the neighboring reference sample only when the difference between the value of the target sample value and the value of the neighboring reference sample satisfies a specific condition (e.g., when the difference belongs to a specific range).

For example, a minimum threshold value $Thres_{min}$ and a maximum threshold value $Thres_{max}$ are defined, the neighboring reference sample is used when |P1-P2| or |P3-P2| is greater than $Thres_{min}$ and/or smaller than $Thres_{max}$ and the neighboring reference sample is excluded from filtering operation in other cases.

Specifically, when a 3-tap filter according to the above expression 1 is applied, for example, filtering can be applied as follows according to whether the difference between the value of the target sample value and the value of the neighboring reference sample satisfies the specific condition.

$$Pred'[x, y] = \begin{cases} \left(\alpha P1 + \beta P2 + \gamma P3 + \frac{\alpha + \beta + \gamma}{2}\right) / (\alpha + \beta + \gamma), & \text{if Case 1} \\ \left(\alpha P1 + \beta P2 + \frac{\alpha + \beta}{2}\right) / (\alpha + \beta), & \text{if Case 2} \\ \left(\beta P2 + \gamma P3 + \frac{\beta + \gamma}{2}\right) / (\beta + \gamma), & \text{if Case 3} \\ P2, & \text{otherwise} \end{cases} \quad \text{[Equation 2]}$$

Here, Case1 represents a case in which both |P1-P2| and |P3-P2| satisfy the specific condition, Case2 represents a case in which |P1-P2| satisfies the specific condition whereas |P3-P2| does not satisfy the specific condition, and Case3 represents a case in which |P1-P2| does not satisfy the specific condition whereas |P3-P2| satisfies the specific condition. Otherwise, that is, in a case in which both |P1-P2| and |P3-P2| do not satisfy the specific condition, filtering is not applied to the target sample P2. That is, $\gamma$ is set to 0 when |P1-P2| does not satisfy the specific condition and $\alpha$ is set to 0 when |P3-P2| does not satisfy the specific condition.

Specifically, the above cases can be defined as shown in the following table, for example.

TABLE 4

Case1: $Thres_{min}$ < | P1-P2 | < $Thres_{max}$ and $Thres_{min}$ < | P3-P2 | < $Thres_{max}$
Case2: $Thres_{min}$ < | P1-P2 | < $Thres_{max}$ and | P3-P2 | is outside of the range ($Thres_{min}$, $Thres_{max}$)
Case3: $Thres_{min}$ < | P3-P2 | < $Thres_{max}$ and | P1-P2 | is outside of the range ($Thres_{min}$, $Thres_{max}$)
Otherwise, | P1-P2 | and | P3-P2 | are outside of the range ($Thres_{min}$, $Thres_{max}$)

That is, according to the above table, a case in which both |P1-P2| and |P3-P2| are greater than $Thres_{min}$ and less than $Thres_{max}$ corresponds to Case1, a case in which only |P1-P2| is greater than $Thres_{min}$ and less than $Thres_{max}$ corresponds to Case2, a case in which only |P3-P2| is greater than $Thres_{min}$ and less than $Thres_{max}$ corresponds to Case3, a case in which both |P1-P2| and |P3-P2| are not greater than $Thres_{min}$ and are not less than $Thres_{max}$ corresponds to the other case. In this case, it is possible to determine the case for the target sample and to apply filtering to the target sample according to the above expression 2.

In application of filtering according to the present invention, other filter coefficients may be applied on the basis of the position of a target (prediction) sample.

Due to the characteristics of intra-prediction, prediction accuracy with respect to a sample close to neighboring samples of the current block is higher than prediction accuracy with respect to a sample far from the neighboring samples of the current block. Accordingly, a weak filter (e.g., weak smoothing filter) can be applied to prediction samples within a specific distance from the neighboring samples of the current block and a strong filter (e.g., strong smoothing filter) can be applied to other samples. In this case, the neighboring samples can be positioned at the left and upper sides of the current block, and thus whether a weak filter or a strong filter is applied to prediction samples can be adaptively determined on the basis of distances from the left boundary and/or the upper boundary of the current block. That is, a weak filter can be applied to near boundary samples positioned within a specific distance from the left boundary and/or the upper boundary of the current block and a strong filter can be applied to other inner samples.

Figure 8:
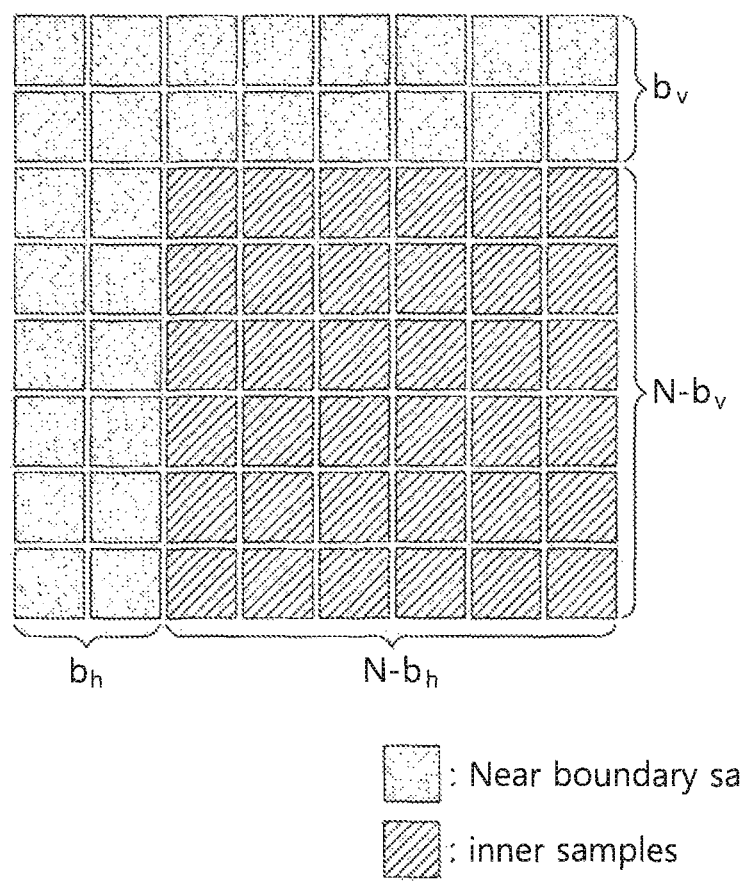
FIG. 8 illustrates an example of discrimination between near boundary samples and inner samples of a current block.

FIG. 8 illustrates an example of discrimination between near boundary samples and inner samples of the current block. FIG. 8 shows a case in which the current block has a size of N×N.

Referring to FIG. 8, $b_h$ (0≤$b_h$≤N) indicates a horizontal distance from the left boundary of the current block and $b_v$ (0≤$b_v$≤N) indicates a vertical distance from the upper boundary of the current block. $b_h$ and $b_v$ may be predetermined or determined by an encoding device and related information may be signaled.

Samples in the current block may be divided into at least two groups on the basis of $b_h$ and/or $b_v$. For example, when coordinates of the position of the left-top sample of the current block is (0, 0), samples at positions satisfying x<$b_h$ or y<$b_v$ may be classified as a first group samples (e.g., near boundary samples) and samples at positions satisfying $b_h$≤x and $b_v$≤y may be classified as a second group samples (e.g., inner samples). In this case, weak filtering can be applied to the first group samples and strong filtering can be applied to the second group samples. Here, filter coefficients applied to weak filtering may differ from those applied to strong filtering, as described above. Specifically, value $\beta$ when weak filtering is applied may be greater than value $\beta$ when strong filtering is applied, among the aforementioned filter coefficients. As another example, values α and γ when weak filtering is applied may be greater than values α and γ when strong filtering is applied.

Meanwhile, whether the prediction sample post-processing filtering method according to the present invention may be indicated by flag information. For example, whether the prediction sample post-processing filtering method according to the present invention is applied to the current block may be determined by an encoding device and indicated using intra post filter flag information. The intra post filter flag information may be signaled in units of a CU or PU, for example.

For example, the intra post filter flag information can be signaled in units of a CU as follows.

TABLE 5

| | Descriptor |
|---|---|
| coding_unit( x0, y0, log2CbSize ) { | |
|     if( transquant_bypass_enabled_flag ) | |
|         cu_transquant_bypass_flag | ae(v) |
|     if( slice_type != I ) | |
|         cu_skip_flag[ x0 ][ y0 ] | ae(v) |
|     nCbS = ( 1 << log2CbSize ) | |
|     if( cu_skip_flag[ x0 ][ y0 ] ) | |
|         prediction_unit( x0, y0, nCbS, nCbS ) | |
|     else { | |
|         if( slice_type != I ) | |
|             pred_mode_flag | ae(v) |
|         if( CuPredMode[ x0 ][ y0 ] == MODE_INTRA) | |
|             intra_post_filter_flag | ae(v) |
|         if( CuPredMode[ x0 ][ y0 ] != MODE_INTRA \|\| log2CbSize == MinCbLog2SizeY ) | |
|             part_mode | ae(v) |
|         if( CuPredMode[ x0 ][ y0 ] == MODE_INTRA ) { | |
|         ... | |
|         } else { | |
|             pbOffset = ( PartMode == PART_NxN ) ? ( nCbS / 2 ) : nCbS | |
|             for( j = 0; j < nCbS; j = j + pbOffset ) | |
|                 for( i = 0; i < nCbS; i = i + pbOffset ) | |
|                     prev_intra_luma_pred_flag[ x0 + i ][ y0 + j ] | ae(v) |
|             for( j = 0; j < nCbS; j = j + pbOffset ) | |
|                 for( i = 0; i < nCbS; i = i + pbOffset ) | |
|                 if( prev_intra_luma_pred_flag[ x0 + i ][ y0 + j ] ) | |
|                     mpm_idx[ x0 + i ][ y0 + j ] | ae(v) |
|                 else | |
|                     rem_intra_luma_pred_mode[ x0 + i ][ y0 + j ] | ae(v) |
|             intra_chroma_pred_mode[ x0 ][ y0 ] | ae(v) |
| ... | |

Here, the intra_post_filter_flag syntax element corresponds to the intra post filter flag information. The intra_post_filter_flag syntax element can be encoded/decoded on the basis of context-adaptive binary arithmetic coding (CABAC). When intra-prediction is applied to a current CU, a decoding device may parse the intra_post_filter_flag syntax element from a bitstream and determine whether the prediction sample post-processing filtering according to the present invention is applied on the basis of the value of the intra_post_filter_flag syntax element. When the value of the intra_post_filter_flag syntax element is 1, the decoding device can determine that the prediction sample post-processing filter according to the present invention is applied to the current block.

Alternatively, the intra post filter flag information may be signaled in units of a PU as follows.

TABLE 6

| | Descriptor |
|---|---|
| coding_unit( x0, y0, log2CbSize ) { | |
|     if( transquant_bypass_enabled_flag ) | |
|         cu_transquant_bypass_flag | ae(v) |
|     if( slice_type != I ) | |
|         cu_skip_flag[ x0 ][ y0 ] | ae(v) |
|     nCbS = ( 1 << log2CbSize ) | |
|     if( cu_skip_flag[ x0 ][ y0 ] ) | |
|         prediction_unit( x0, y0, nCbS, nCbS ) | |
|     else { | |

TABLE 6-continued

| | Descriptor |
|---|---|
| if( slice_type != I ) | |
|     pred_mode_flag | ae(v) |
|     if( CuPredMode[ x0 ][ y0 ] != MODE_INTRA \|\| log2CbSize == MinCbLog2SizeY ) | |
|         part_mode | ae(v) |
|     if( CuPredMode[ x0 ][ y0 ] == MODE_INTRA ) { | |
|         ... | |
|     } else { | |
|         pbOffset = ( PartMode == PART_NxN ) ? ( nCbS / 2 ) : nCbS | |
|         for( j = 0; j < nCbS; j = j + pbtOffset ) | |
|             for( i = 0; i < nCbS; i = i + pbOffset ) | |
|                 prev_intra_luma_pred_flag[ x0 + i ][ y0 + j ] | ae(v) |
|                 intra_post_filter_flag[ x0 + i ][ y0 + j ] | ae(v) |
|         for( j = 0; j < nCbS; j = j + pbOffset ) | |
|             for( i = 0; i < nCbS; i = i + pbOffset ) | |
|                 if( prev_intra_luma_pred_flag[ x0 + i ][ y0 + j ] ) | |
|                     mpm_idx[ x0 + i ][ y0 + j ] | ae(v) |
|                 else | |
|                     rem_intra_luma_pred_mode[ x0 + i ][ y0 + j ] | ae(v) |
|         intra_chroma_pred_mode[ x0 ][ y0 ] | ae(v) |
|         intra_chroma_post_filter_flag[ x0 ][ y0 ] | ac(v) |
| ... | |

Here, the intra_post_filter_flag syntax element corresponds to the intra post filter flag information. In addition, the intra_chroma_post_filter_flag syntax element may also correspond to the intra post filter flag information. In this case, the intra_post_filter_flag syntax element indicates whether the prediction sample post-processing filtering is applied to a luma component and the intra_chroma_post_filter_flag syntax element indicates whether the prediction sample post-processing filtering is applied to a chroma component. The intra_post_filter_flag syntax element and the intra_chroma_post_filter_flag syntax element may be encoded/decoded on the basis of context-adaptive binary arithmetic coding (CABAC). The decoding device may parse the intra_post_filter_flag syntax element and the intra_chroma_post_filter_flag syntax element from a bitstream and determine whether the prediction sample post-processing filtering according to the present invention is applied.

When the value of the intra_post_filter_flag syntax element is 1, the decoding device can determine that the prediction sample post-processing filtering is applied to the luma component (i.e., luma sample) of the current block. When the value of the intra_chroma_post_filter_flag syntax element is 1, the decoding device can determine that the prediction sample post-processing filtering is applied to the chroma component (i.e., chroma sample) of the current block.

When the intra post filter flag information is signaled in units of a PU, as described above, the number of bits that need to be transmitted increases compared to a case in which the intra post filter flag information is signaled in units of a CU, whereas whether filtering is performed on PUs partitioned on the basis of a CU can be independently determined and whether filtering is performed on a chroma component can be determined independently from a luma component.

An intra-prediction method according to the present invention may be performed according to the flowchart described below, for example.

Figure 9:
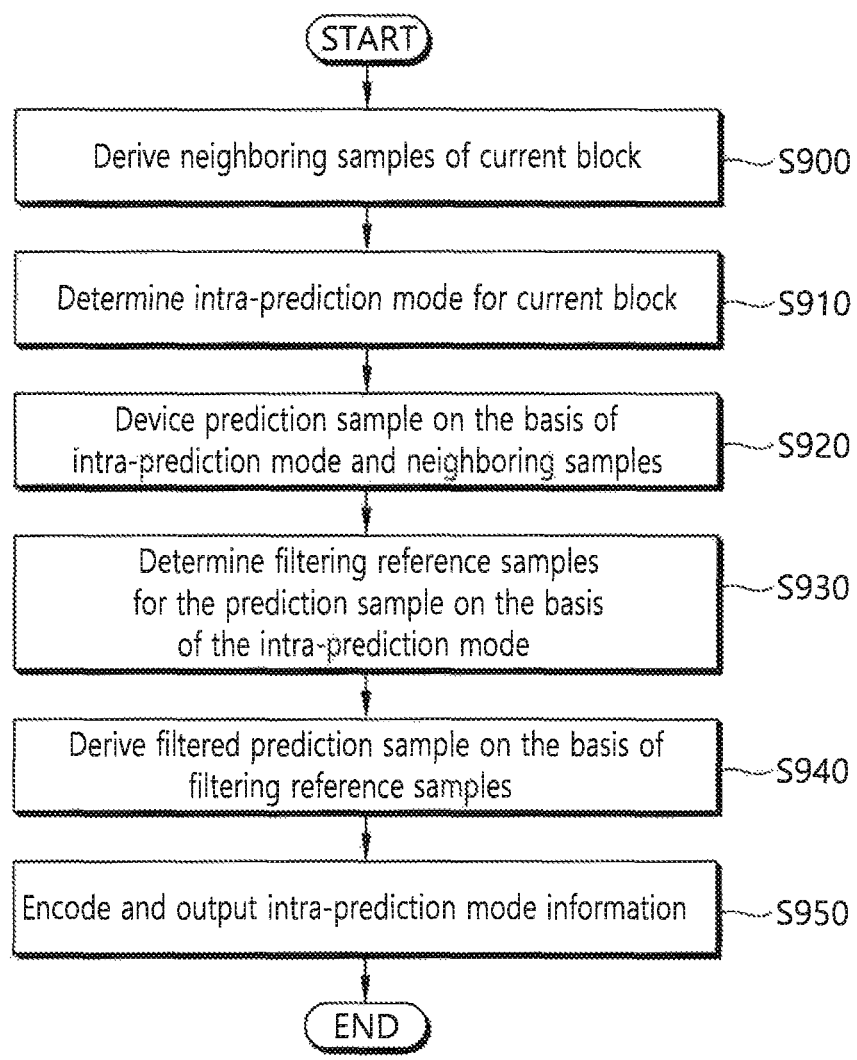
FIG. 9 schematically illustrates an example of an intra-prediction method of an encoding device according to the present invention.

FIG. 9 schematically illustrates an example of an intra-prediction method of an encoding device according to the present invention. The method illustrated in FIG. 9 may be performed by the encoding device illustrated in FIG. 1. Specifically, S900 to S940 in FIG. 9 may be performed by the predictor of the encoding device and S950 may be performed by the entropy encoder of the encoding device, for example.

Referring to FIG. 9, the encoding device derives neighboring samples of the current block for intra-prediction (S900). For example, when the top-left sample position of the current block is regarded as (0, 0), left neighboring samples p[−1][2N−1], . . . , p[−1][0]), top-left neighboring sample p[−1][−1] and upper neighboring samples p[0][−1], . . . , p[2N−1][−1] may be derived as the neighboring samples of the current block for intra-prediction. Here, p[m][n] indicates a sample (or pixel) of a sample position (m, n). N corresponds to the width and height of the current block. When the current block is a transform block, N may be represented as nTbS. If the width of the current block is W and the height thereof is H, the left neighboring samples p[−1][2H−1], . . . , p[−1][0], top-left neighboring sample p[−1][−1] and upper neighboring samples p[0][−1], . . . , p[2W−1][−1] may be derived as the neighboring reference samples.

The encoding device determines an intra-prediction mode for the current block (S910). Here, the intra-prediction mode may be one of the modes shown in Table 1. Alternatively, the intra-prediction method according to the present invention may be applied only when the intra-prediction mode of the current block is an intra-directional mode. In this case, the intra-directional mode may be one of intra-angular 2 to intra-angular 34 modes shown in Table 1. Here, the current block may correspond to the current TU. For example, at least one PU and at least one TU may be derived from the current CU. In this case, one or more TUs may be presented in the area of the PU. For example, an inter/intra-prediction type can be determined in the current CU and a specific intra-prediction mode can be determined in the PU. In this case, the TUs in the PU area can share the determined intra-prediction mode. The encoding device can determine an optimal intra-prediction mode on the basis of RD (rate-distortion) cost.

The encoding device derives a prediction sample for the current block on the basis of the intra-prediction mode and the neighboring samples (S920). The encoding device can derive the prediction sample using neighboring samples positioned in the prediction direction of the intra-prediction mode on the basis of the sample position of the prediction sample.

The encoding device determines filtering reference samples for the prediction sample on the basis of the intra-prediction mode (S930). The encoding device may determine a category corresponding to the intra-prediction mode and determine the filtering reference samples on the basis of relative positional relationship with the prediction sample according to the determined category.

For example, the encoding device may divide a plurality of intra-prediction modes into a plurality of categories on the basis of equal division or unequal division depending on angles. For example, the encoding device can divide the intra-prediction modes into four categories. In this case, the encoding device can determine the category corresponding to the intra-prediction mode on the basis of Table 2 or 3.

The encoding device may determine a filter pattern according to the determined category. For example, when the intra-prediction mode corresponds to the first category, the filter pattern may be a horizontal pattern. In this case, the filtering reference samples may include a left neighboring sample P1 and a right neighboring sample P3 of the prediction sample. As another example, when the intra-prediction mode corresponds to the second category, the filter pattern may be a vertical pattern. In this case, the filtering reference samples may include an upper neighboring sample P1 and a lower neighboring sample P3 of the prediction sample. As another example, when the intra-prediction mode corresponds to the third category, the filter pattern may be a right-upward diagonal pattern. In this case, the filtering reference samples may include a left lower neighboring sample P1 and a right upper neighboring sample P3 of the prediction sample. As another example, when the intra-prediction mode corresponds to the fourth category, the filter pattern may be a left-upward diagonal pattern. In this case, the filtering reference samples may include a left upper neighboring sample P1 and a right lower neighboring sample P3 of the prediction sample.

The encoding device applies filtering to the prediction sample on the basis of the filtering reference samples to derive a filtered prediction sample (S940). The encoding device may derive the filtered prediction sample using filter coefficients on the basis of the filtering reference samples determined according to the filter pattern.

For example, the filtered prediction sample can be derived on the basis of the aforementioned expression 1 or 2.

In this case, values of the filtering reference samples may correspond to P1 and P3 and P2 may correspond to the value of the prediction sample. In this case, $\gamma$ may be set to 0 when |P1−P2| does not specify a specific condition or a may be set to 0 when |P3−P2| does not specify the specific condition. For example, the specific condition may be specified when |P1−P2| or |P3−P2| is greater than a predetermined minimum threshold value and less than a predetermined maximum threshold value.

The encoding device may determine whether strong filtering or weak filtering is applied to the prediction sample. The encoding device may determine whether strong filtering or weak filtering is applied to the prediction sample on the basis of a distance between the sample position of the prediction sample and the left boundary or upper boundary of the current block. Specifically, the encoding device may derive a horizontal distance and a vertical distance for filter strength discrimination, determine that weak filtering is applied to the prediction sample when the sample position of the prediction sample is within the horizontal distance from the left boundary or within the vertical distance from the upper boundary, and determine that strong filtering is applied to the prediction sample when the sample position of the prediction sample is separated from the left boundary by the horizontal distance or longer and separated from the upper boundary by the vertical distance or longer.

The encoding device may derive the filter coefficients having different values according to whether strong filtering or weak filtering is applied to the prediction sample. Specifically, among the filter coefficients, value $\beta$ when weak filtering is applied may be greater than value $\beta$ when strong filtering is applied. As another example, among the filter coefficients, values $\alpha$ and $\gamma$ when weak filtering is applied may be greater than values $\alpha$ and $\gamma$ when strong filtering is applied.

The encoding device encodes and output intra-prediction mode information indicating the intra-prediction mode for the current block (S950). The encoding device may encode the intra-prediction mode information and output the encoded intra-prediction mode information in the form of a bitstream. The bitstream may be transmitted to a decoding device through a network or a storage medium.

The encoding device may generate a residual sample on the basis of the filtered prediction sample for the current block and the original sample. The encoding device may encode residual information on the residual sample and output the encoded residual information in the form of a bitstream. The residual information may include quantized transform coefficients with respect to residual samples for the current block.

The encoding device may encode an intra-post filter flag indicating whether prediction sample post-processing filtering according to the present invention is applied to the current block and outputs the encoded intra-post filter flag in the form of a bitstream. In this case, the intra-post filter flag may be signaled in units of a CU or in units of a PU. When the intra-post filter flag is signaled in units of a PU, it is possible to independently indicate whether the prediction sample post-processing filtering is applied to a luma component and a chroma component of the current block.

Figure 10:
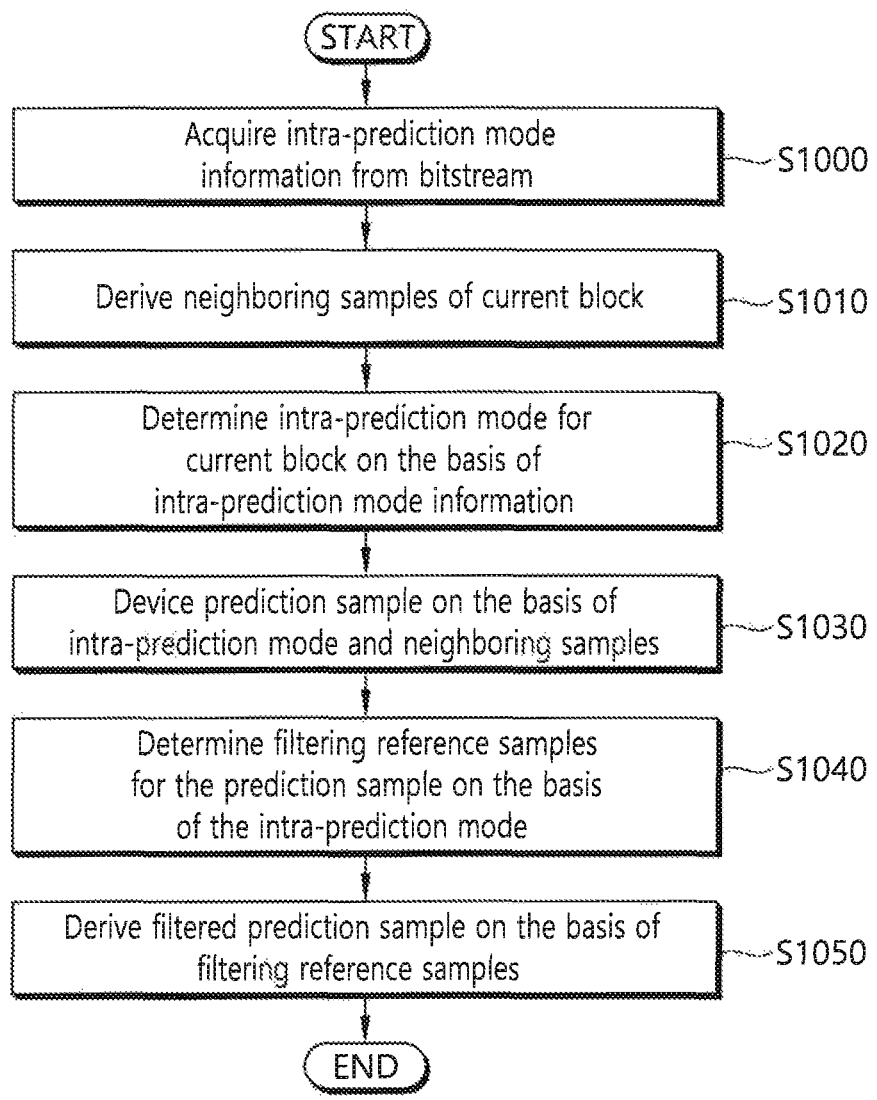
FIG. 10 schematically illustrates an example of an intra-prediction method of a decoding device according to the present invention.

FIG. 10 schematically illustrates an example of an intra-prediction method of a decoding device according to the present invention. The method illustrated in FIG. 10 may be performed by the decoding device illustrated in FIG. 2. Specifically, S1000 in FIG. 10 may be performed by the entropy decoder of the decoding device and S1010 and S1050 may be performed by the predictor of the decoding device, for example.

Referring to FIG. 10, the decoding device acquires intra-prediction mode information from a bitstream (S1000). The decoding device may decode the bitstream received from an encoding device to acquire the intra-prediction mode information. The bitstream may be received through a network or a storage medium.

The decoding device derives neighboring samples of the current block for intra-prediction (S1010). For example, when the top-left sample position of the current block is regarded as (0, 0), left neighboring samples p[−1][2N−1], . . . , p[−1][0]), top-left neighboring sample p[−1][−1] and upper neighboring samples p[0][−1], . . . , p[2N−1][−1] may be derived as the neighboring samples of the current block for intra-prediction. Here, p[m][n] indicates a sample (or pixel) of a sample position (m, n), as described above. N corresponds to the width and height of the current block. When the current block is a transform block, N may be represented as nTbS. If the width of the current block is W and the height thereof is H, the left neighboring samples p[−1][2H−1], . . . , p[−1][0], top-left neighboring sample p[−1][−1] and upper neighboring samples p[0][−1], . . . , p[2 W−1][−1] may be derived as the neighboring reference samples.

The decoding device determines an intra-prediction mode for the current block on the basis of the intra-prediction mode information (S1020). Here, the intra-prediction mode may be one of the modes shown in Table 1. Alternatively, the intra-prediction method according to the present invention may be applied only when the intra-prediction mode of the current block is an intra-directional mode. In this case, the intra-directional mode may be one of intra-angular 2 to intra-angular 34 modes shown in Table 1. Here, the current block may correspond to the current TU. For example, at least one PU and at least one TU may be derived from the current CU. In this case, one or more TUs may be presented in the area of the PU. For example, an inter/intra-prediction type can be determined in the current CU and a specific intra-prediction mode can be determined in the PU. In this case, the TUs in the PU area can share the determined intra-prediction mode.

The decoding device may determine the intra-prediction mode according to whether the MPM (most probable mode) or the remaining mode is applied. When the MPM is applied, an MPM list may be determined on the basis of an intra-prediction mode for the left or upper neighboring block of the PU and the intra-prediction mode may be determined on the basis of the MPM list. In this case, the decoding device may acquire an MPM index from the bitstream and derive an intra-prediction mode candidate indicated by the MPM index among candidates in the MPM list as the intra-prediction mode of the current block. Otherwise, when the remaining mode is applied, the decoding device may acquire information indicating a specific intra-prediction mode among the remaining modes that are not included in the MPM list from the bitstream and derive the intra-prediction mode of the current block on the basis of the information indicating the specific intra-prediction mode.

The decoding device derives a prediction sample for the current block on the basis of the intra-prediction mode and the neighboring samples (S1030). The decoding device can derive the prediction sample using neighboring samples positioned in the prediction direction of the intra-prediction mode on the basis of the sample position of the prediction sample.

The decoding device determines filtering reference samples for the prediction sample on the basis of the intra-prediction mode (S1040). The decoding device may determine a category corresponding to the intra-prediction mode and determine the filtering reference samples on the basis of relative positional relationship with the prediction sample according to the determined category.

For example, the decoding device may divide a plurality of intra-prediction modes into a plurality of categories on the basis of equal division or unequal division depending on angles. For example, the encoding device can divide the intra-prediction modes into four categories. In this case, the decoding device can determine the category corresponding to the intra-prediction mode on the basis of Table 2 or 3.

The decoding device may determine a filter pattern according to the determined category. For example, when the intra-prediction mode corresponds to the first category, the filter pattern may be a horizontal pattern. In this case, the filtering reference samples may include a left neighboring sample P1 and a right neighboring sample P3 of the prediction sample. As another example, when the intra-prediction mode corresponds to the second category, the filter pattern may be a vertical pattern. In this case, the filtering reference samples may include an upper neighboring sample P1 and a lower neighboring sample P3 of the prediction sample. As another example, when the intra-prediction mode corresponds to the third category, the filter pattern may be a right-upward diagonal pattern. In this case, the filtering reference samples may include a left lower neighboring sample P1 and a right upper neighboring sample P3 of the prediction sample. As another example, when the intra-prediction mode corresponds to the fourth category, the filter pattern may be a left-upward diagonal pattern. In this case, the filtering reference samples may include a left upper neighboring sample P1 and a right lower neighboring sample P3 of the prediction sample.

The decoding device applies filtering to the prediction sample on the basis of the filtering reference samples to derive a filtered prediction sample (S1050). The decoding device may derive the filtered prediction sample using filter coefficients on the basis of the filtering reference samples determined according to the filter pattern.

For example, the filtered prediction sample can be derived on the basis of the aforementioned expression 1 or 2.

In this case, values of the filtering reference samples may correspond to P1 and P3 and P2 may correspond to the value of the prediction sample. In this case, $\gamma$ may be set to 0 when |P1−P2| does not specify a specific condition or $\alpha$ may be set to 0 when |P3-P2| does not specify the specific condition. For example, the specific condition may be specified when |P1-P2| or |P3-P2| is greater than a predetermined minimum threshold value and less than a predetermined maximum threshold value.

The decoding device may determine whether strong filtering or weak filtering is applied to the prediction sample. The decoding device may determine whether strong filtering or weak filtering is applied to the prediction sample on the basis of a distance between the sample position of the prediction sample and the left boundary or upper boundary of the current block. Specifically, the decoding device may derive a horizontal distance and a vertical distance for filter strength discrimination, determine that weak filtering is applied to the prediction sample when the sample position of the prediction sample is within the horizontal distance from the left boundary or within the vertical distance from the upper boundary, and determine that strong filtering is applied to the prediction sample when the sample position of the prediction sample is separated from the left boundary by the horizontal distance or longer and separated from the upper boundary by the vertical distance or longer.

The decoding device may derive the filter coefficients having different values according to whether strong filtering or weak filtering is applied to the prediction sample. Specifically, among the filter coefficients, value $\beta$ when weak filtering is applied may be greater than value $\beta$ when strong filtering is applied. As another example, among the filter coefficients, values $\alpha$ and $\gamma$ when weak filtering is applied may be greater than values $\alpha$ and $\gamma$ when strong filtering is applied.

The decoding device may acquire residual information from the bitstream and derive a residual sample for the current block on the basis of the residual information. The decoding device may generate a reconstructed sample and a reconstructed picture on the basis of the filtered prediction sample and the residual sample.

The decoding device may acquire an intra-post filter flag indicating whether prediction sample post-processing filtering according to the present invention is applied to the current block from the bitstream, and when the intra-post filter flag indicates 1, apply filtering to the prediction sample to derive the filtered prediction sample. The intra-post filter flag may be signaled in units of a CU or in units of a PU. When the intra-post filter flag is signaled in units of a PU, it is possible to independently indicate whether the prediction sample post-processing filtering is applied to a luma component and a chroma component of the current block.

According to the present invention, it is possible to adaptively filter a prediction sample according to intra-prediction mode and to improve intra-prediction performance.

According to the present invention, it is possible to apply filtering using various filter patterns to a prediction sample according to the category to which intra-prediction mode belongs and to adaptively determine filter strength depending on the sample position of the prediction sample.

Therefore, it is possible to improve intra-prediction performance while minimizing transmission of additional auxiliary information and thus to reduce the quantity of data necessary for a residual signal and to enhance coding efficiency according to the present invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An intra-prediction method performed by a decoding device, comprising:
    acquiring intra-prediction mode information from a bitstream;
    deriving neighboring samples of a current block;
    determining an intra-prediction mode for the current block based on the intra-prediction mode information;
    deriving a prediction sample of the current block based on the intra-prediction mode and the neighboring samples;
    determining filtering reference samples for the prediction sample based on the intra-prediction mode; and
    applying filtering to the prediction sample based on the filtering reference samples to derive a filtered prediction sample,
    wherein the determining of the filtering reference samples comprises:
    determining a category corresponding to the intra-prediction mode; and
    determining the filtering reference samples based on a relative positional relationship with respect to the prediction sample according to the determined category, comprising:
        filtering reference samples including a left neighboring sample and a right neighboring sample of the prediction sample based on the determined category being a first category;
        filtering reference samples including an upper neighboring sample and a lower neighboring sample of the prediction sample based on the determined category being a second category;
        filtering reference samples including a left lower neighboring sample and a right upper neighboring sample of the prediction sample based on the determined category being a third category; and
        filtering reference samples including a left upper neighboring sample and a right lower neighboring sample of the prediction sample based on the determined category being a fourth category.

2. The intra-prediction method according to claim 1, wherein the category corresponding to the intra-prediction mode is determined based on the following table, and a filter pattern used for the filtering depends on the category.

| Category | Intra-prediction mode |
| --- | --- |
| A | 6, 7, 8, 9, 10, 11, 12, 13, 14 |
| B | 22, 23, 24, 25, 26, 27, 28, 29, 30 |
| C | 15, 16, 17, 18, 19, 20, 21 |
| D | 2, 3, 4, 5, 31, 32, 33, 34. |

3. The intra-prediction method according to claim 1, wherein the category corresponding to the intra-prediction mode is determined based on the following table, and a filter pattern used for the filtering depends on the category.

| | Intra-prediction mode | | | | | | | | | | |
| --- | --- | --- | --- | --- | --- | --- | --- | --- | --- | --- | --- |
| | 2 | 3 | 4 | 5 | 6 | 7 | ... | 30 | 31 | 32 | 33 | 34 |
| Category | D | D | D | A | C | B | ... | B | B | D | D | D. |

4. The intra-prediction method according to claim 1, wherein the filtered prediction sample is derived based on the following expression, $$Pred'[x, y] = \left(\alpha P1 + \beta P2 + \gamma P3 + \frac{\alpha + \beta + \gamma}{2}\right) / (\alpha + \beta + \gamma)$$

wherein Pred' indicates the filtered prediction sample, P2 indicates a value of the prediction sample, P1 and P3 indicate values of the filtering reference samples, and α, β and γ indicate filter coefficients.

5. The intra-prediction method according to claim 4, wherein γ is set to 0 when |P1−P2| does not satisfy a specific condition or α is set to 0 when |P3−P2| does not satisfy the specific condition.

6. The intra-prediction method according to claim 5, wherein the specific condition is satisfied when |P1−P2| or |P3−P2| is greater than a predetermined minimum threshold value and less than a predetermined maximum threshold value.

7. The intra-prediction method according to claim 4, further comprising determining whether strong filtering or weak filtering is applied to the prediction sample,
   wherein the filter coefficients having different values depending on whether strong filtering or weak filtering is applied to the prediction sample are derived.

8. The intra-prediction method according to claim 7, wherein whether strong filtering or weak filtering is applied to the prediction sample is determined based on a distance between a sample position of the prediction sample and left boundary or upper boundary of the current block.

9. The intra-prediction method according to claim 8, further comprising deriving a horizontal distance and a vertical distance for filter strength discrimination,
   wherein weak filtering is applied to the prediction sample when the sample position of the prediction sample is within the horizontal distance from the left boundary or within the vertical distance from the upper boundary, and
   wherein strong filtering is applied to the prediction sample when the sample position of the prediction sample is separated from the left boundary by the horizontal distance or longer and separated from the upper boundary by the vertical distance or longer.

10. The intra-prediction method according to claim 1, further comprising acquiring an intra post filter flag from the bitstream,
    wherein filtering is applied to the prediction sample to derive the filtered prediction sample when the intra post filter flag indicates 1.

11. The intra-prediction method according to claim 10, wherein the intra post filter flag is signaled in units of a coding unit (CU) or in units of a prediction unit (PU).

12. An intra-prediction method performed by an encoding device, comprising:
    deriving neighboring samples of a current block;
    determining an intra-prediction mode for the current block;
    deriving a prediction sample of the current block based on the intra-prediction mode and the neighboring samples;
    determining filtering reference samples for the prediction sample based on the intra-prediction mode;
    applying filtering to the prediction sample based on the filtering reference samples to derive a filtered prediction sample; and
    encoding and outputting intra-prediction mode information indicating the intra-prediction mode,
    wherein the determining of the filtering reference samples comprises:
       determining a category corresponding to the intra-prediction mode; and
       determining the filtering reference samples based on a relative positional relationship with respect to the prediction sample according to the determined category, comprising:
          filtering reference samples including a left neighboring sample and a right neighboring sample of the prediction sample based on the determined category being a first category;
          filtering reference samples including an upper neighboring sample and a lower neighboring sample of the prediction sample based on the determined category being a second category;
          filtering reference samples including a left lower neighboring sample and a right upper neighboring sample of the prediction sample based on the determined category being a third category; and
          filtering reference samples including a left upper neighboring sample and a right lower neighboring sample of the prediction sample based on the determined category being a fourth category.

13. The intra-prediction method according to claim 1, wherein the categories corresponding to the intra-prediction mode are equally divided based on angles of corresponding prediction directions.

14. The intra-prediction method according to claim 1, wherein the categories corresponding to the intra-prediction mode are randomly determined.

15. The intra-prediction method according to claim 4, wherein filtering reference samples P1 and P3 are in the current block based on the prediction sample P2 being positioned away from a boundary of the current block.

16. The intra-prediction method according to claim 4, wherein at least one of the filtering reference samples P1 and P3 is in a neighboring block based on the prediction sample P2 being positioned at a boundary of the current block.

* * * * *